US008327322B2

(12) United States Patent
Auriemma et al.

(10) Patent No.: US 8,327,322 B2
(45) Date of Patent: Dec. 4, 2012

(54) SYSTEM AND METHOD FOR ALLOWING THE CREATION OF COMPOSITE APPLICATIONS THROUGH THE WIRING OF LOOSELY COUPLED EXISTING OR CUSTOM COMPONENTS OF DISPARATE TECHNOLOGIES

(75) Inventors: Stephen T. Auriemma, Chelmsford, MA (US); Niklas Heidloff, Salzkotten (DE); Bhavan K. Kumar, Maharashtra (IN); Kannepalli V. Sreekanth, Ghorpadi (IN)

(73) Assignee: International Business Machines Corporation, Armonk, NY (US)

( * ) Notice: Subject to any disclaimer, the term of this patent is extended or adjusted under 35 U.S.C. 154(b) by 1145 days.

(21) Appl. No.: 11/966,245

(22) Filed: Dec. 28, 2007

(65) Prior Publication Data

US 2009/0172635 A1 Jul. 2, 2009

(51) Int. Cl.
*G06F 9/44* (2006.01)
(52) U.S. Cl. .................... 717/107; 717/109; 717/113
(58) Field of Classification Search ........... 717/106–119
See application file for complete search history.

(56) References Cited

U.S. PATENT DOCUMENTS

2004/0187140 A1* 9/2004 Aigner et al. ................ 719/328

OTHER PUBLICATIONS

SAP, "SAP NetWeaver Visual Composer: User Guide", 2004, SAP AG, 208 pages.*
Bonnen et al., "SAP NetWeaver™ Visual Composer", 2006, Galileo Press, Chapter 6—Building Applications, pp. 1-15, and 179-211.*

* cited by examiner

*Primary Examiner* — Ted T Vo
(74) *Attorney, Agent, or Firm* — Daniel McLoughlin; Hoffman Warnick LLC

(57) ABSTRACT

The present invention provides a system and method for allowing integration of loosely coupled components for applications requiring templates and, more specifically, for utilizing the property broker and component technology to solve the missing sandbox model for Lotus Notes out of the box templates on the rich client. It utilizes the property broker and component technology so that components can communicate with one another as standard "out of the box" templates (such as Notes mail8.ntf and pernames.ntf) are allowed to publish properties automatically, e.g., when the selections in views/folders change. Customers are then allowed to define their own applications via an editor using pre-existing or "out of the box" components or custom components of disparate technologies. Component views from the out of the box templates can easily be reused by graphically dragging them from a component palette and dropping them onto the page. The composite application is stored in a separate database (in Lotus Notes, the database extension is ".nsf") and so there are no template changes to the contacts database necessary.

23 Claims, 9 Drawing Sheets

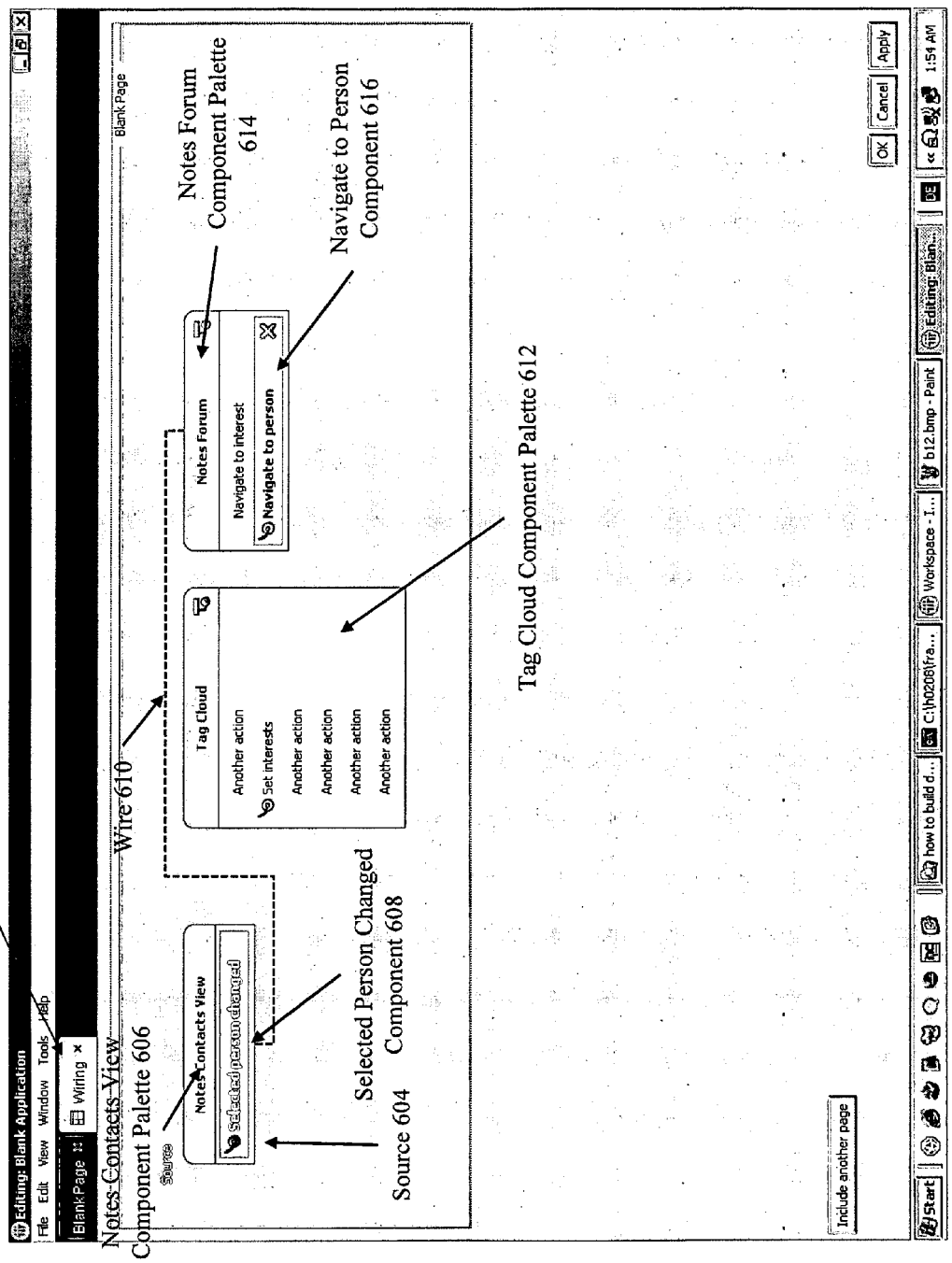
Figure 6 – Component Wiring

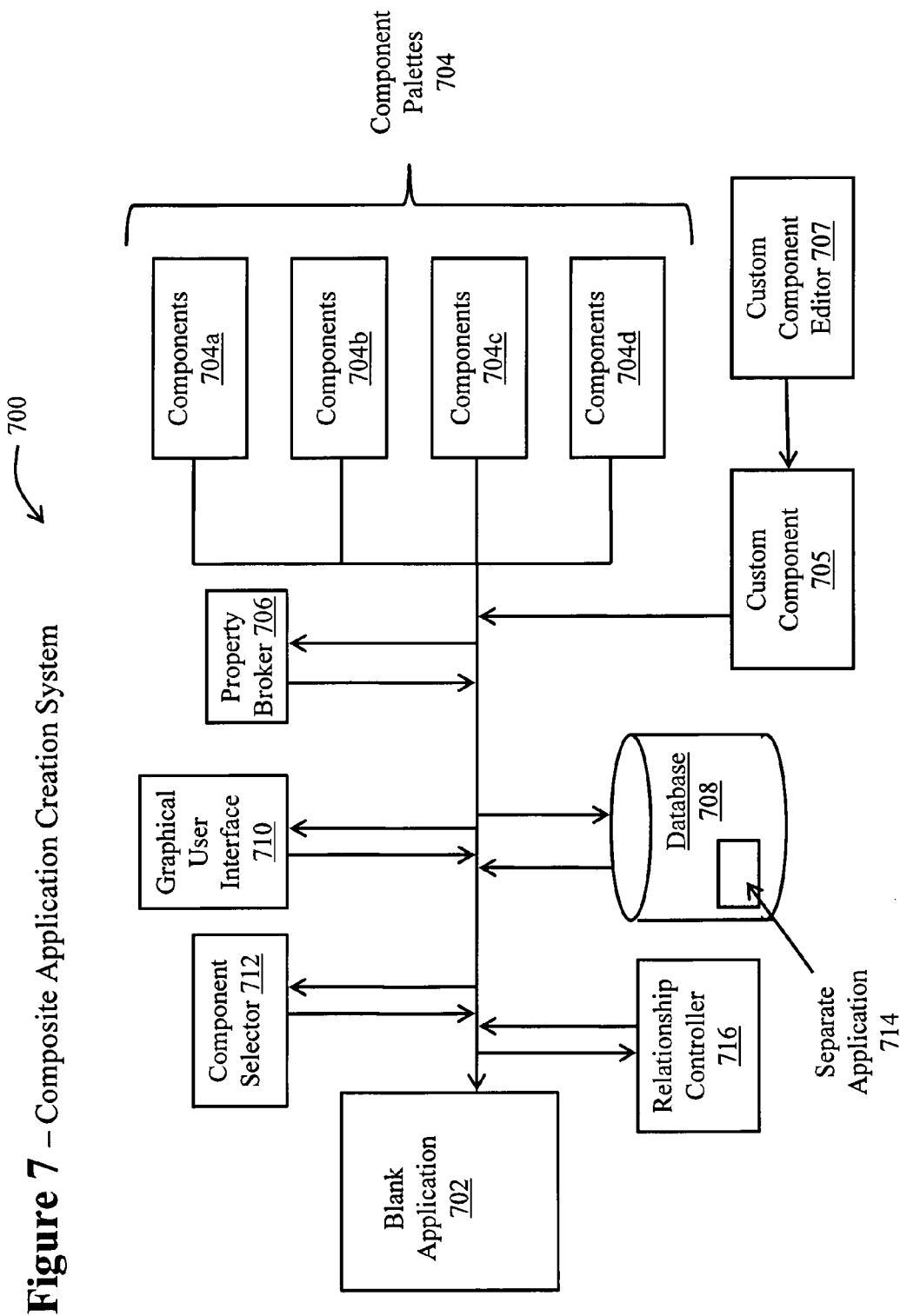

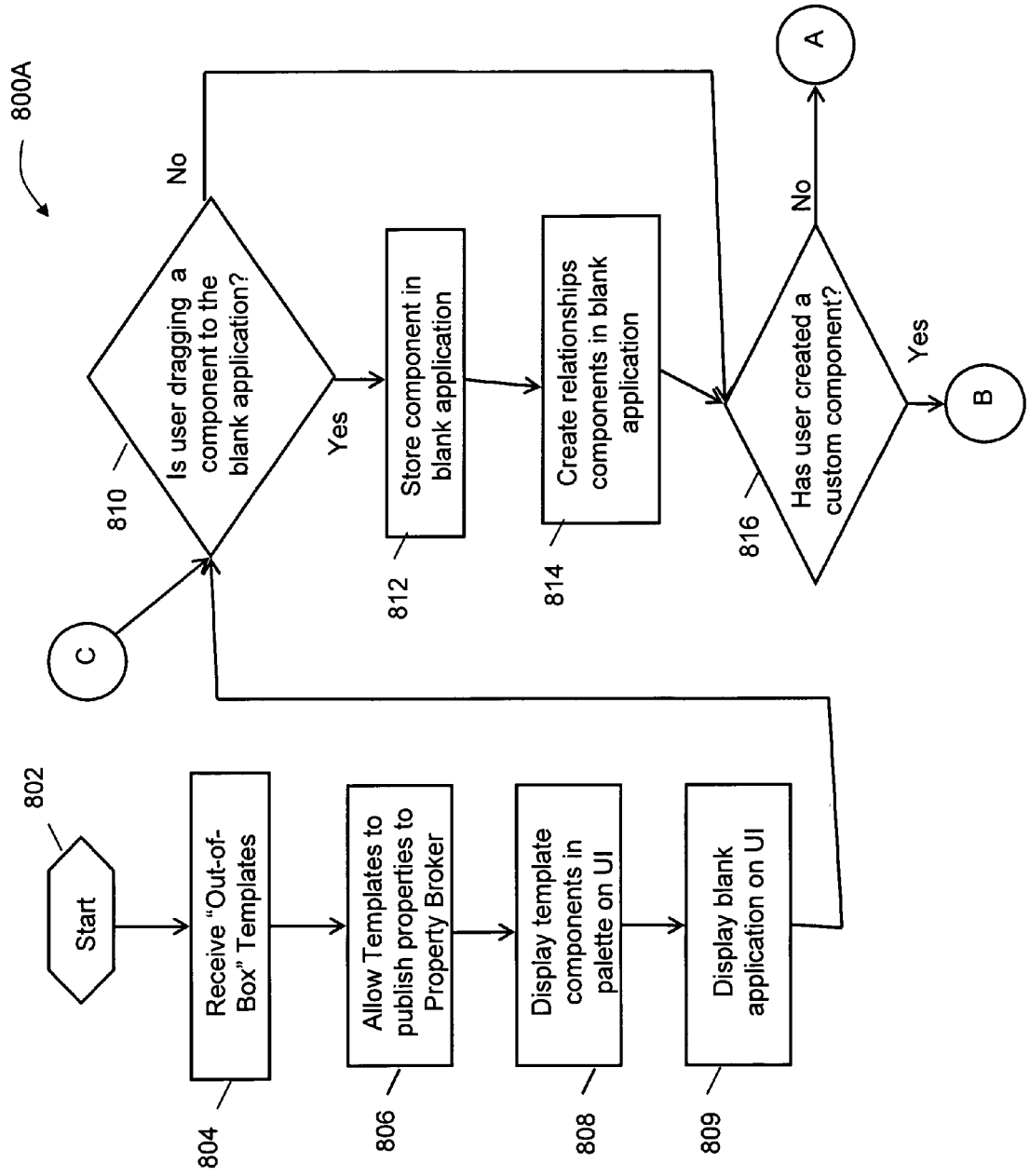
Figure 8A – Composite Application Creation Flow

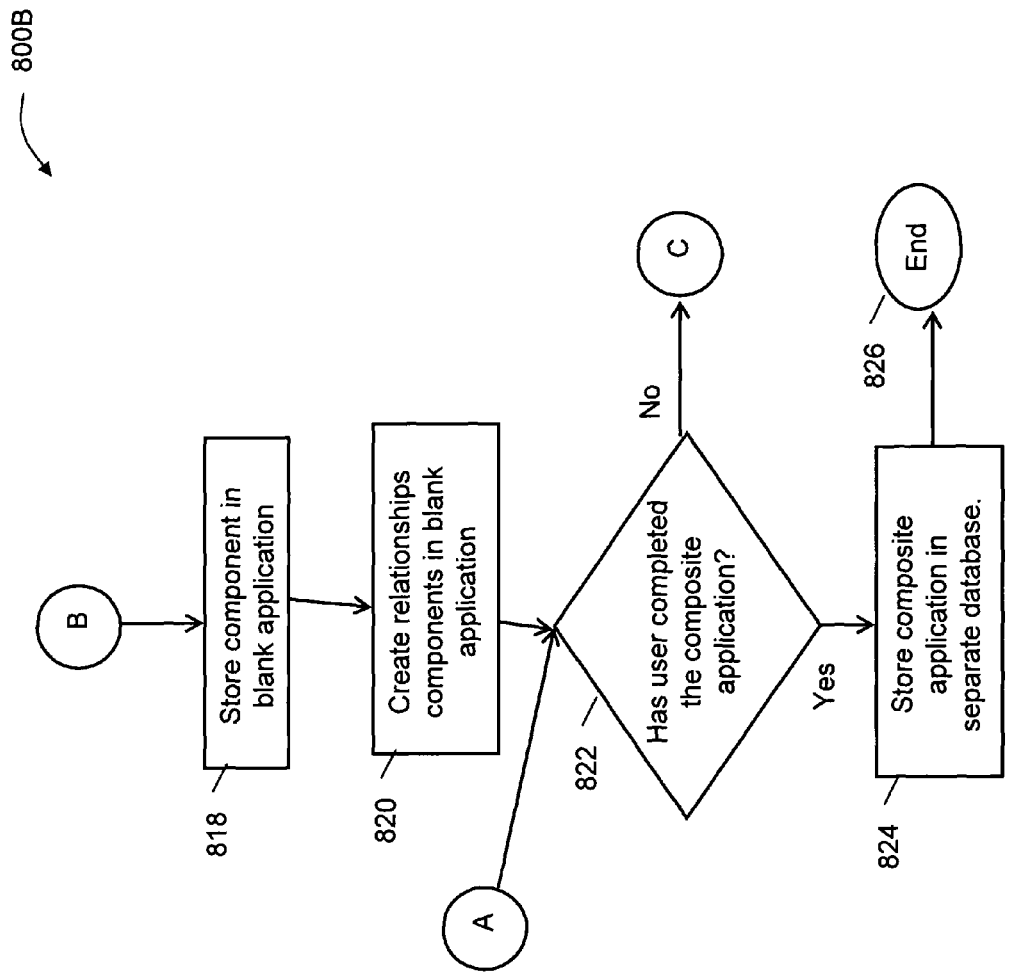
Figure 8B – Composite Application Creation Flow (cont.)

SYSTEM AND METHOD FOR ALLOWING THE CREATION OF COMPOSITE APPLICATIONS THROUGH THE WIRING OF LOOSELY COUPLED EXISTING OR CUSTOM COMPONENTS OF DISPARATE TECHNOLOGIES

BACKGROUND OF THE INVENTION

1. Field of the Invention

The present invention generally relates to coupling components in composite applications. Specifically, the present invention relates to a system and method for allowing: the creation of composite applications utilizing a "drag-and-drop" process on the user's user interface (UI); the wiring of loosely coupled components; the reuse of existing components with little or no change; and the connection of disparate technologies.

2. Related Art

Composite applications in IBM® WPLC® (Workplace, Portal and Collaboration Software) software are the collections of multiple components and component types brought together for a business purpose. The composite applications allow integration of different technologies on the glass so that end users have all of the tools and functions in one application and on one screen which they need to get their jobs done. Composite applications also allow the easy reuse of coarse grained components by using loosely coupled components which talk between each other via a property broker and WSDL. "WSDL" is short for Web Services Description Language, an XML-formatted language used to describe a Web service's capabilities as collections of communication endpoints capable of exchanging messages. WSDL is an integral part of UDDI, an XML-based worldwide business registry. (Universal Description, Discovery and Integration (UDDI) is a platform-independent, XML-based registry for businesses worldwide to list themselves on the Internet.) WSDL is the language that UDDI uses. WSDL was developed jointly by Microsoft and IBM. Composite applications are part of IBM Portal® 6.0, Expeditor 6.1 and will be part of Lotus® Notes® 8.0. More information on IBM's products may be found at www.ibm.com.

"Components" are an approach to organizing and presenting the functionality of a dynamic application by using visually distinct UI pages or sections (blocks) of a user interface. In addition to defining the user interface, a component includes associated business logic and application flow logic.

A Component can be designed as one of the following component types:

Course-Grained Component
  represents the complete user interface appearing in a web browser
Fine-Grained Component
  an elementary unit of dynamic content
  represents a distinct part of the user interface appearing in a web browser
  visually and functionally distinct from other fine-grained components
  are typically a rectangular content area on the user interface
  promotes maximum reusability because web process components can be reused in many user interfaces
  easily identifiable structure element of a user interface (i.e. menu bar, registration)
  can be easily used in WSRP compatible portals or assembled with an assembly component
Assembly Component
  represents a component that aggregates other components at runtime the complete user interface is assembled with two or more other fine-grained components
  the assembly component defines the structure and layout of the user interface
  provides a layout framework similar to a portal Since course-grained components can be very quickly created, they are best suited for one-off UI services that are not expected to be used for very long. As more functionality is added to a service, the course-grained components become more difficult to maintain and re-use.

Fine-grained components are the best approach to implementing UI services. The components can be easily assembled into an application using an assembly component or portal. The UI flow can be easily modified to add or remove components for a UI state.

To promote the re-use of a component, components are designed as loosely coupled as possible. This is accomplished by only including logic (steps) that is directly related to the component's function. Changes to the component should not impact (or at least have minimal impact) to the consumers of the component.

Coupling generally refers to the act of joining two things together, such as the links in a chain. But in software development, coupling typically refers to the degree to which software components/modules depend upon each other. The degree to which components are linked defines whether they operate in a tightly coupled relationship or in a loosely coupled relationship. With tightly coupled components, each component and any auxiliary dependent objects must be present at execution time as well as compile time. On the other hand, loosely coupled components can operate independently from one another.

Lotus Notes customers are always trying to avoid template changes in the templates which come out of the box with Lotus Notes. The term "template", when used in the context of file format, refers to a common feature of many software applications which defines a unique file format intended specifically for a particular application. Template file formats are those whose file extension indicates that the file type is intended as a starting point from which to create other files. For Lotus Notes, the file extension is ".ntf"—"Notes Template Format". Examples of Notes templates which are very highly likely to be used by users are the mail template (mail8.ntf) (for creating email files) and the contacts template (pernames.ntf) (for creating address book entries).

The reason for that Lotus Notes customers try to avoid template changes is that no sufficient "sandbox" model for templates presently exists. (A "sandbox" is a testing (or virtual) environment that isolates untested code changes and outright experimentation from the production environment or repository, in the context of software development including web development and revision control, and by extension in web-based editing environments including wikis. A template sandbox would also have a repository of templates which have been tested and debugged—such as the template which the user wished to be used.) Because there is no repository of templates which have been tested and debugged, the customer is forced to make changes to the templates himself and, because the customer may not be familiar with the particular template, may make errors. For instance, whenever a customer changes the templates himself, there is a great chance that he will overwrite his changes without his knowledge. For instance, if the user updates his application or databases, his modified template may be overwritten. It is only after he has updated his databases to the new versions of the out of the box templates that he notices the errors and then has to redo his changes again.

Some companies like SAP AG and Microsoft Corporation have also some form of composite applications, but none of them really support loosely coupled components. (SAP AG is the largest European software enterprise and the third largest in the world, with headquarters in Walldorf, Germany. Microsoft Corporation is an American multinational computer technology corporation with 79,000 employees in 102 countries. There are no other technologies which allow integrations of loosely coupled components on the glass.

Therefore, there exists a need for a solution that solves at least one of the deficiencies of the related art.

SUMMARY OF THE INVENTION

In general, the present invention provides a system and method for allowing integration of loosely coupled components for applications requiring templates and, more specifically, for utilizing the property broker and component technology to solve the missing sandbox model for Lotus Notes out of the box templates on the rich client.

The present invention utilizes the property broker and component technology to provide the missing sandbox model for Notes out of the box templates on the rich client. According to the present invention, standard "out of the box" templates (such as Notes mail8.ntf and pernames.ntf) are allowed to publish properties automatically, e.g., when the selections in views/folders change. As an example, the contacts view "all contacts" could publish the display name of the currently selected person in the view.

Customers are then allowed to define their own applications via an editor, such as the Composite Application Editor which comes with Lotus Notes version 8.0. Component views from the out of the box templates can easily be reused by graphically dragging them from a component palette and dropping them onto the page.

After that additional custom components which provide additional functionality can be added.

In order to define the relations between the out of the box and custom components, the property broker technology is used. This technology allows inter-component communication between loosely coupled components. Components define their output properties which they publish and their actions which can be invoked with input properties on the component level. The relations/wires between them are then only defined on the composite application level. The Composite Application Editor provides a wiring UI to define these wires graphically.

The composite application is stored in a separate database (in Lotus Notes, the database extension is ".nsf") and so there are no template changes to the contacts database necessary.

BRIEF DESCRIPTION OF THE DRAWINGS

These and other features of this invention will be more readily understood from the following detailed description of the various aspects of the invention taken in conjunction with the accompanying drawings in which:

FIG. 6 shows an embodiment of the user interface (UI) of the present invention illustrating, partially, the wiring an application between two components.

FIG. 7 shows a block diagram of an embodiment of the present invention.

FIGS. 8A and 8B show a flow diagram of the composite application (template) creation process of the present invention.

Figure 1:
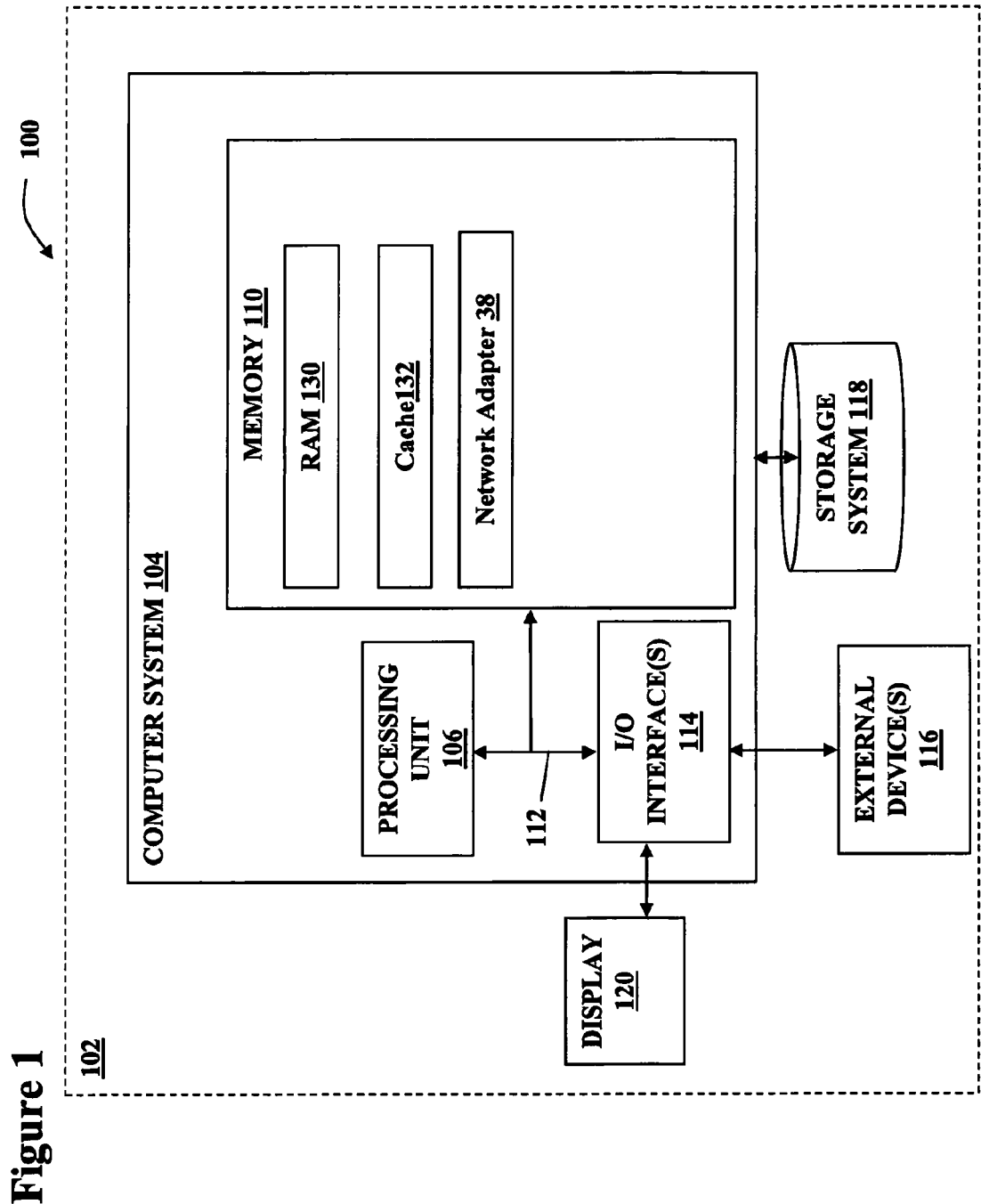
FIG. 1 shows a system suitable for storing and/or executing program code, such as the program code of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE DRAWINGS

The present invention provides a system and method for allowing integration of loosely coupled components for applications requiring templates so that composite applications, such as templates, may be created utilizing a "drag-and-drop" process on the user's UI. Further, the present invention provides for a system and method for providing a UI for illustrating the wiring between components so that the relationships between the components is clearly illustrated to the user and so that the relationships between the components may be easily modified by the user.

Every NSF component defines its interfaces in a WSDL that are stored in the NSF as design notes. As was discussed above, "WSDL" is short for Web Services Description Language, an XML-formatted language used to describe a Web service's capabilities as collections of communication endpoints capable of exchanging messages. As was noted above, Notes Storage Format (.nsf) is a file type for Lotus Notes databases for containing basic units of storage known as a "note".

The present invention utilizes the property broker function to allow components to communicate with one another. The client property broker is a broker that allows for declarative properties, actions, and wires to be used among completely decoupled components. The property broker is responsible for taking changed properties and distributing the property values to the appropriate actions as defined by the wires that are registered. The property broker separates itself from a traditional pub/sub in that it is a controlled pub/sub that is driven by declarative markup. Meaning an XML or another data source defines how the two components communicate with each other—which property change is passed onto which action within the component. The second differentiation is the chain effect that can be accomplished by taking input parameters and posting output parameters. This ability allows for an infinite amount of Property>Action>Property combinations.

Components that contribute to the broker most likely do not call into the APIs directly, and instead use the extension point and the declarative WSDL to declare its actions and properties. The preferred model allows little knowledge of the broker and its APIs, providing a good level of abstraction from the broker implementation. At most, a component calls into the broker to post a changed property and then performs an evaluation of the received property changes to complete the action on the changed property.

For instance, the mail and contacts views/folders can publish properties such as:
   commonName;
   canonicalName;
   emailAddress; and
   Notes URL of currently selected document.

A data processing system, such as that system 100 shown in FIG. 1, suitable for storing and/or executing program code, such as the program code of the present invention, will include at least one processor (processing unit 106) coupled directly or indirectly to memory elements through a system bus. The memory elements can include local memory (RAM 130) employed during actual execution of the program code, bulk storage (storage 118), and cache memories (cache 132) which provide temporary storage of at least some program code in order to reduce the number of times code must be retrieved from bulk storage during execution. Input/output or I/O devices (external devices 116) (including but not limited to keyboards, displays, pointing devices, etc.) can be coupled to the system either directly or through intervening I/O controllers (I/O Interface 114).

Figure 2:
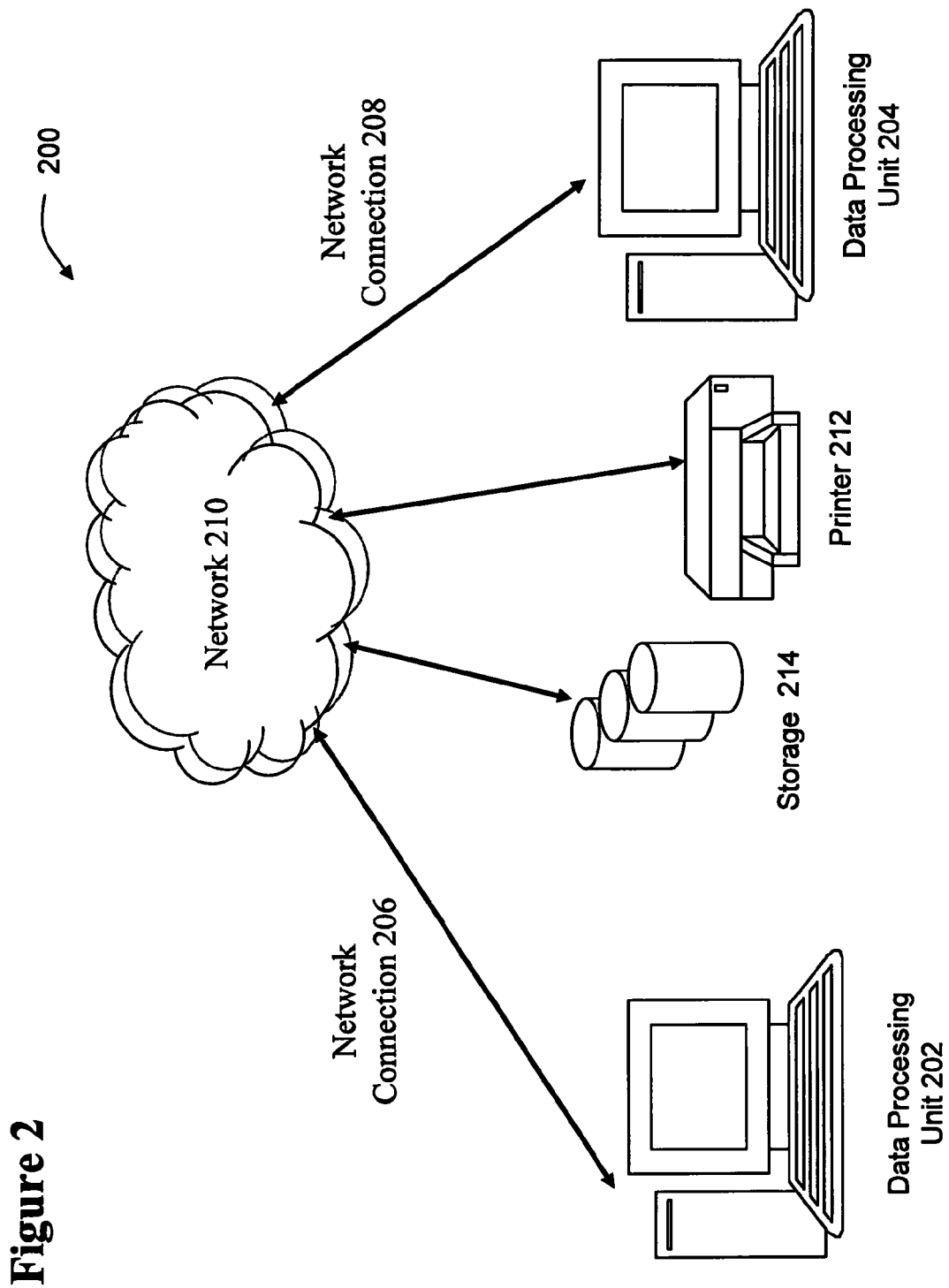
FIG. 2 shows an illustrative communication network for implementing the method of the present invention.

Network adapters (network adapter 138) may also be coupled to the system to enable the data processing system (as shown in FIG. 2, data processing unit 102) to become coupled to other data processing systems (data processing unit 204) or remote printers (printer 212) or storage devices (storage 214) through intervening private or public networks (network 210). (A computer network is composed of multiple computers connected together using a telecommunication system for the purpose of sharing data, resources and communication. Modems, cable modem and Ethernet cards are just a few of the currently available types of network adapters. (A network card, network adapter or NIC (network interface card) is a piece of computer hardware designed to allow computers to communicate over a computer network. It is both an OSI layer 1 (physical layer) and layer 2 (data link layer) device, as it provides physical access to a networking medium and provides a low-level addressing system through the use of MAC addresses. It allows users to connect to each other either by using cables or wirelessly.)

Figure 3:
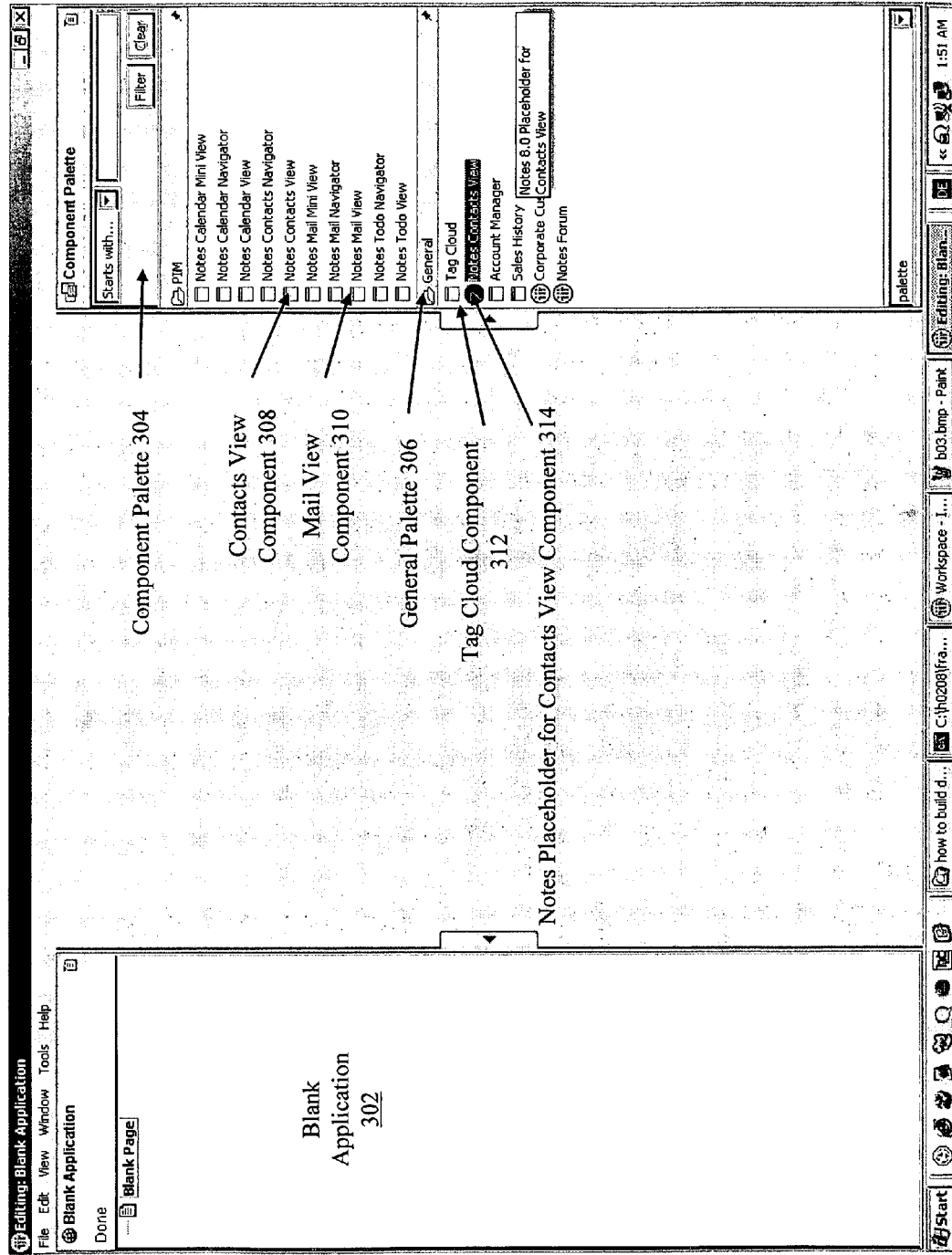
FIG. 3 shows an embodiment of the user interface (UI) of the present invention illustrating a blank application and component palettes.

FIG. 3 illustrates a user interface (UI) 300 of one embodiment of the present invention. On the left hand side of the figure, blank application 302 is the area of the UI where the user may drag-and-drop components from component palette 304 and general palette 306. Component Palette 304 has numerous components such as contacts view component 308 and mail view component 310. General component palette 306 has numerous components such as tag cloud component 312 and Notes placeholder for contacts view component 314. The user may drag-and-drop these components from the palettes to the blank application area 302 to create a composite application. As was noted above, the system and method of the present invention utilizes the property broker function to allow components to communicate with one another. The components publish properties to the property broker which is responsible for taking the properties and distributing the property values to the appropriate actions as defined by the wires that are registered.

Figure 4:
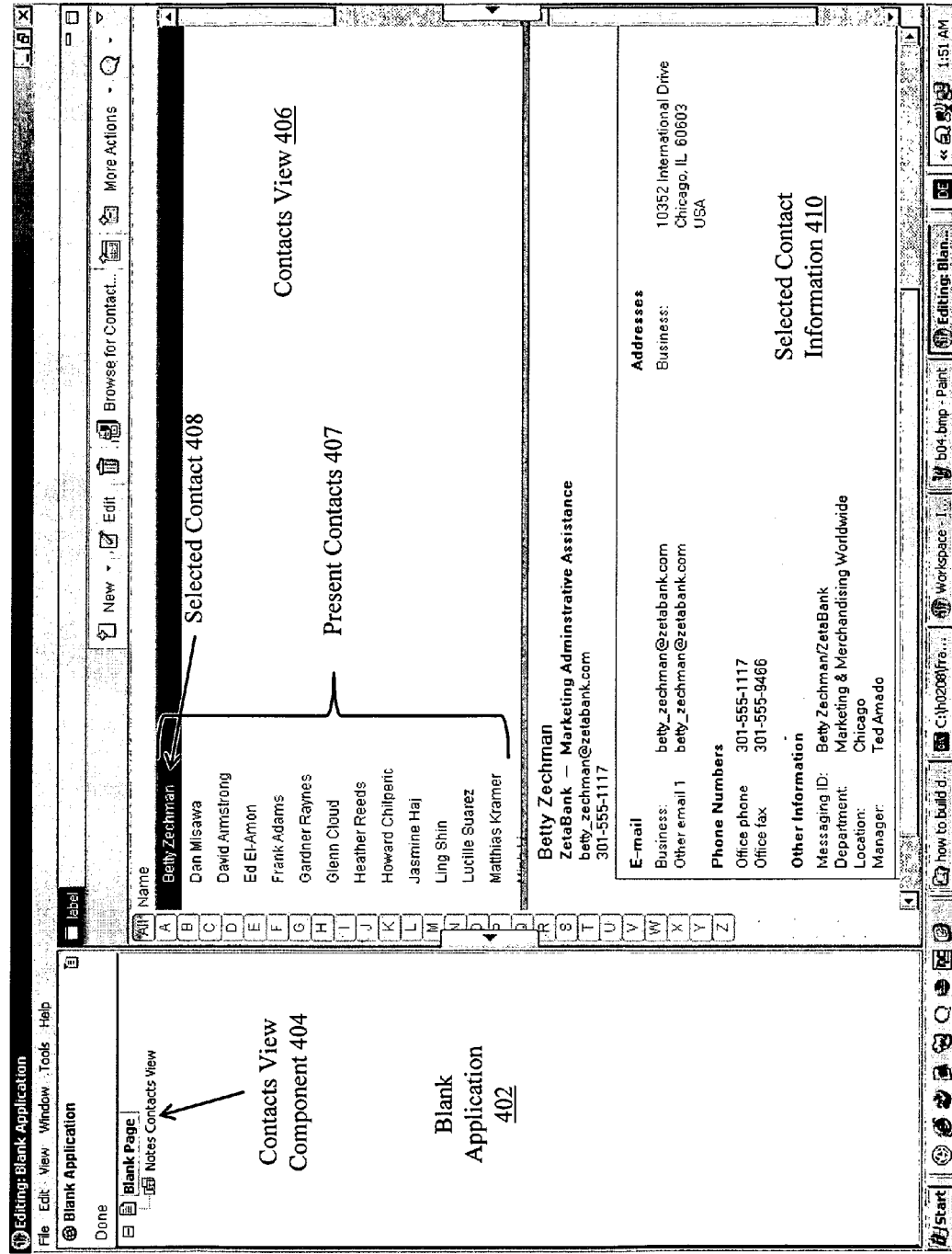
FIG. 4 shows an embodiment of the user interface (UI) of the present invention illustrating an application utilizing the contacts view component.

FIG. 4 illustrates a user interface (UI) 400 of one embodiment of the present invention showing one component being dragged into the blank application area 402. As can be seen, contacts view component 404 has been dragged from the component palette to the blank application area 402 by the user. As a result, contact view 406 is displayed showing user's present contacts 407. The user has selected a user (selected user 408) and is shown in the selected contact information frame 410.

Figure 5:
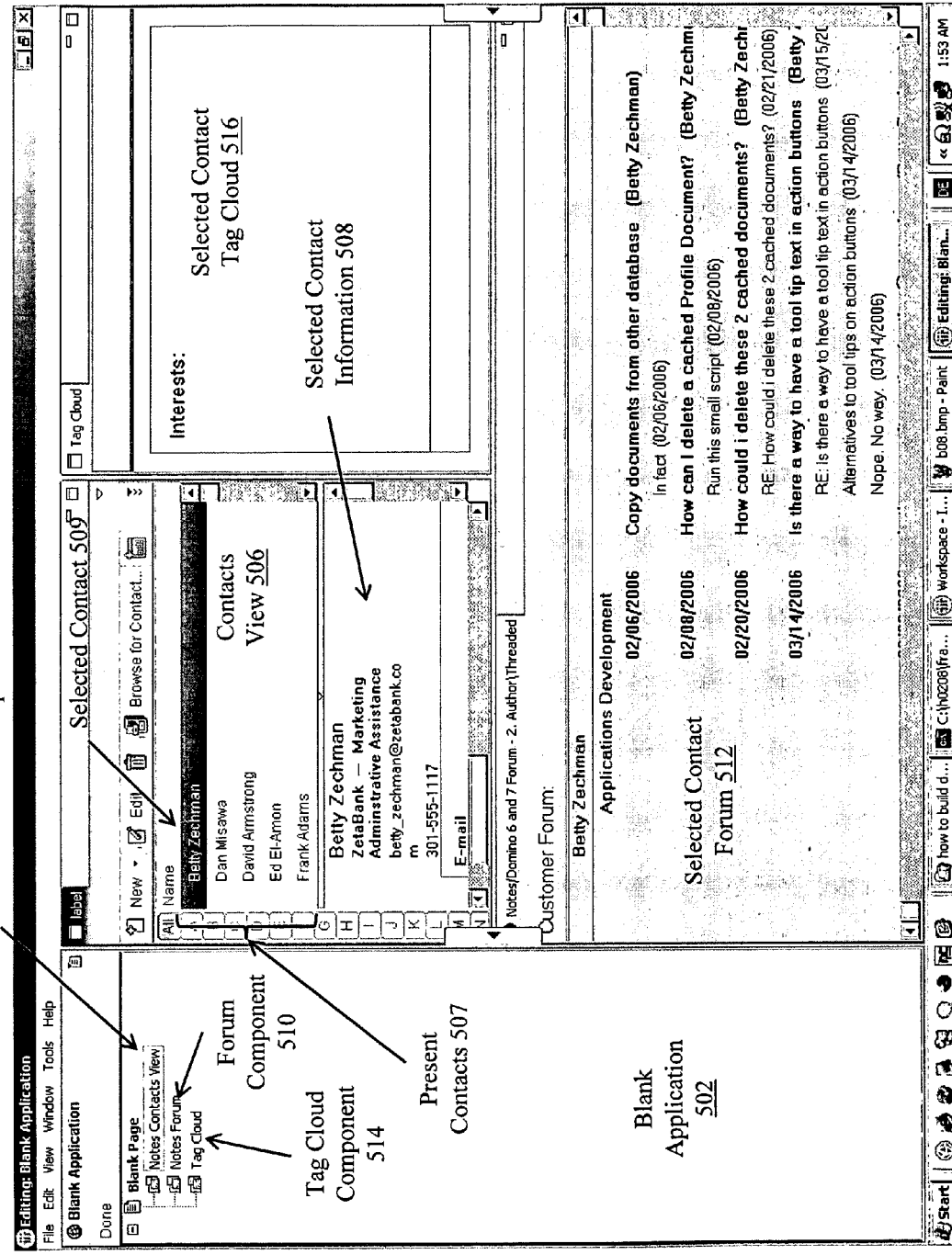
FIG. 5 shows an embodiment of the user interface (UI) of the present invention illustrating a composite application utilizing multiple components communicating with one another.

FIG. 5 illustrates a user interface (UI) 500 of one embodiment of the present invention showing three components (Contacts View Component 504, Forum Component 510, and Tag Cloud Component 514) being dragged into the blank application area 502. As was shown in FIG. 4, Contacts View Component 504 provides, on the UI 500, a Contacts View 506 having the user's Present Contacts 507 in his contacts database (.nsf). The Selected Contact Information 508 of the Selected Contact 509 is shown in a separate frame. The user's selection of Forum Component 510 provides the Selected Contact Forum 512 in a separate frame on UI 500. The use of the property broker function allows the Contacts View Component 504 to communicate with Forum Component 510 so that the forum data is that of the Selected Contact 509. Likewise, the user has selected the Tag Cloud Component 514 and dragged and dropped it into the Blank Application area 502. Again, the use of the property broker function allows the Contacts View Component 504 to communicate with Tag Cloud Component 514 so that the Tag Cloud Information 516 is that of the Selected Contact 509.

FIG. 6 illustrates a user interface (UI) 600 of one embodiment of the present invention illustrating one of the wires between components. The user's selection of Wiring Tab 602 provides the user a wiring view having a Source 604 having a Notes Contacts View Component Palette 606 showing a Selected Person (contact) Changed Component 608. It further has a Tag Cloud Component Palette 612 and a Notes Forum Component Palette 614. Because the selected contact was changed, a new Wire 610 is created from the Selected Person Changed Component 608 to a Navigate to Person Component 616 in the Notes Forum Component Palette 614. This provides the user with a visual representation of the relationships between the components and allows the user to modify the relationships between the components in a GUI manner.

FIG. 7 illustrates a block diagram 700 of the system of one embodiment of the present invention having a Blank Application 702 which can become populated with Components 704a, 704b, 704c, 704d from Component Palettes 704. Components 704a, 704b, 704c, 704d are pre-constructed and Component Palettes 704 are populated with these Components 704a, 704b, 704c, 704d from external applications such as templates, e.g., as was discussed in the example of the present invention, a mail template and a contacts template. In addition, the user may create a Custom Component 705 utilizing a Custom Component Editor 707. As was discussed, each Components 704a, 704b, 704c, 704d, 705 publishes its properties to Property Broker 706 which manages the component properties so that, if selected by user (utilizing the UI drag and drop function according to the present invention), the components may communicate with one another. After the user has completed creating the composite application, such as a contacts template or a mail template, he saves the application as a .ntf (Notes Template Format) file in Database 708. Graphical User Interface 710 provides a graphical view of the available components for the user to utilize in his composite application and to show the wires indicating relationships between the selected components. A Component Selector 712 allows the user to select and to drag a Component 704a, 704b, 704c, 704d from the Component Palettes 704 to and dropping the selected component in the Blank Application 702. Once the application 702 is complete, it is stored as a Separate Application 714 having a different extension than the application from which the pre-constructed Components 704a, 704b, 704c, 704d originated. In that way, when updates are provided to the user, the user's new composite application, such as a new custom template, is not overwritten by the update. The System 700 further has a Relationship Controller 716 which allows the user to modify the created relationships between the selected components via the Graphical User Interface 710. As was discussed above, the created relationships could be displayed in the form of "wires". A system, such as that shown in FIG. 1, could be used to provide the memory, processor, I/O functions, etc., for the system of FIG. 7. For instance, the Graphical User Interface 710 could be Display 120 interfacing with the Computer System 104 via I/O Interface(s) 114 and the Component Selector 712 could be a mouse (External Device(s) 116). Of course, Processing Unit 106, Storage System 118, and Memory 110 would provide basic functions for the system of the present invention.

FIG. 8A and FIG. 8B illustrate a flow chart block diagram 800A and 800B, respectively, of the method of one embodiment of the present invention which starts at 802 and continues to step 804 where the system receives the "Out-of-the-box" Templates. At 806, the templates and their components publish their properties to the property broker and, at step 808, the components are displayed in a palette on the UI. At step 810, blank application is displayed on UI. At step 810, it is determined whether the user is dragging, on the UI, a template component to the blank application and, if not, the method jumps to step 816 which will be discussed below. If so, at step 812, the component is stored in the blank application and, at step 814, relationships between other components previously in the blank application, if any, are created. These relationships would be shown with wires in the wiring view as previously discussed and shown in FIG. 6. At step 816, the system determines whether the user has created a custom component and, if not, the method proceeds, via A, to step 822 on FIG. 8B to be discussed below. If so, the method proceeds, via B, to step 818 on FIG. 8B where the component is stored in the blank application and relationships with other components in the blank application are created at step 820. At step 822, it is determined whether the user has completed the composite application (template) and, if not, the method returns to step 810 via C and, if so, the new template is stored in a separate database at step 824 and ends at 826. By storing the template in a separate database, any updates created by the manufacturer which are installed to the system by the user will not overwrite the custom created application (template).

It should be understood that the present invention is typically computer-implemented via hardware and/or software. As such, and client systems and/or servers will include computerized components as known in the art. Such components typically include (among others), a processing unit, a memory, a bus, input/output (I/O) interfaces, external devices, etc. It should also be understood that although a specific embodiment involving the integration of loosely coupled components for applications requiring templates so that composite applications, such as templates, may be created utilizing a "drag-and-drop" process on the user's UI has been depicted and described, the present invention could be implemented in conjunction with any type of composite application creation system or method.

While shown and described herein as a system and method for allowing integration of loosely coupled components for applications requiring templates so that composite applications, such as templates, may be created utilizing a "drag-and-drop" process on the user's UI, it is understood that the invention further provides various alternative embodiments. For example, in one embodiment, the invention provides a computer-readable/useable medium that includes computer program code to enable a computer infrastructure to allowing integration of loosely coupled components for applications requiring templates so that composite applications, such as templates, may be created utilizing a "drag-and-drop" process on the user's UI. To this extent, the computer-readable/useable medium includes program code that implements each of the various process steps of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory and/or storage system (e.g., a fixed disk, a read-only memory, a random access memory, a cache memory, etc.), and/or as a data signal (e.g., a propagated signal) traveling over a network (e.g., during a wired/wireless electronic distribution of the program code).

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A computer-implemented method, implemented on at least one computer device, for allowing integration of loosely coupled components for applications requiring templates so that composite applications, such as templates, may be created utilizing a "drag-and-drop" process a graphical user interface of a user, the method comprising the steps of:
   a. receiving, using the at least one computer device, one or more pre-constructed components;
   b. publishing properties, on the at least one computer device, of the one or more components to a property broker;
   c. displaying, on the at least one computer device, the one or more components on the graphical user interface of the user;
   d. displaying, on the at least one computer device, a blank application area on the graphical user interface of the user;
   e. determining, using the at least one computer device, whether the user is dragging a component to the blank application area;
      1) if so,
         i. storing the component in the blank application; and
         ii. creating relationships with other components already in the blank application, wherein the property broker automatically creates the relationships, and wherein the relationships are displayed graphically on the user's graphical user interface in the form of wires;

f. determining, using the at least one computer device, whether the user has created a custom component;
   1) if so,
      i. storing the component in the blank application; and
      ii. creating relationships with other components already in the blank application using the property broker; and g. determining, using the at least one computer device, whether the user has completed the composite application;
   1) if so, storing the completed composite application in a separate database and ending the method;
   2) if not, returning to step e.

2. The method of claim 1 wherein the user may change the relationships through the user's graphical user interface.

3. The method of claim 1 wherein the pre-constructed components are from out-of-the-box templates.

4. The method of claim 3 wherein the composite application is a template.

5. The method of claim 4 wherein one of the components is a contacts view component for displaying the user's present contacts, each of the present contacts having contact information such that, when a contact is selected, the selected contact's information is displayed on the graphical user interface.

6. The method of claim 5 wherein one of the components is a mail view component wherein, when a contact is selected, the selected contact's mail is displayed along with the selected contact's information.

7. The method of claim 5 wherein one of the components is a forum view component wherein, when a contact is selected, the selected contact's forum is displayed along with the selected contact's information.

8. The method of claim 5 wherein one of the components is a tag cloud view component wherein, when a contact is selected, the selected contact's tag cloud is displayed along with the selected contact's information.

9. A computer program comprising program code stored on a non-transitory computer-readable storage medium, which when executed, enables a computer system to implement the following steps in a method for allowing integration of loosely coupled components for applications requiring templates so that composite applications, such as templates, may be created utilizing a "drag-and-drop" process on a graphical user interface of a user, the method comprising the steps of:

a. receiving one or more pre-constructed components;
b. publishing properties of the one or more components to a property broker;
c. displaying the one or more components on the graphical user interface of the user;
d. displaying a blank application area on the graphical user interface of the user;
e. determining whether the user is dragging a component to the blank application area;
   1) if so,
      i. storing the component in the blank application; and
      ii. creating relationships with other components already in the blank application using the property broker;
f. determining whether the user has created a custom component;
   1) if so,
      i. storing the component in the blank application; and
      ii. creating relationships with other components already in the blank application, wherein the property broker automatically creates the relationships, and wherein the relationships are displayed graphically on the user's graphical user interface in the form of wires; and
g. determining whether the user has completed the composite application;
   1) if so, storing the completed composite application in a separate database and ending the method;
   2) if not, returning to step e.

10. The computer program of claim 9 wherein the user may change the relationships through the user's graphical user interface.

11. The computer program of claim 9 wherein the pre-constructed components are from out-of-the-box templates.

12. The computer program of claim 11 wherein the composite application is a template.

13. The computer program of claim 12 wherein one of the components is a contacts view component for displaying the user's present contacts, each of the present contacts having contact information such that, when a contact is selected, the selected contact's information is displayed on the graphical user interface.

14. The computer program of claim 13 wherein one of the components is a mail view component wherein, when a contact is selected, the selected contact's mail is displayed along with the selected contact's information.

15. The computer program of claim 13 wherein one of the components is a forum view component wherein, when a contact is selected, the selected contact's forum is displayed along with the selected contact's information.

16. The computer program of claim 13 wherein one of the components is a tag cloud view component wherein, when a contact is selected, the selected contact's tag cloud is displayed along with the selected contact's information.

17. A system for allowing integration of loosely coupled components for applications requiring templates so that composite applications, such as templates, may be created utilizing a graphical user interface of a user, the system comprising:

at least one computer device including:
   a. one or more pre-constructed components in one or more component palettes;
   b. a property broker for receiving properties displayed by the pre-constructed components;
   c. a blank application;
   d. a graphical user interface for displaying a representation of the blank application and representations of the one or more pre-constructed components;
   e. a custom component editor for creating a custom component;
   f. a component selector for allowing the user to select one or more pre-constructed components or the custom component to be utilized in the blank application on the graphical user interface;
   g. a database for storing a completed composite application; and
   wherein the graphical user interface is further for displaying relationships between the selected components, wherein the property broker automatically creates the relationships between the selected components, and the relationships being displayed as wires.

18. The system of claim 17 wherein the component selector allows the user to "drag and drop" the selected component to the representation of the blank application on the user's graphical user interface.

19. The system of claim 17 wherein the one or more pre-constructed components are pre-loaded from an original template.

20. The system of claim 19 wherein the completed composite application is stored with a different extension from the original template.

21. The system of claim 17 wherein the system further comprises a relationship controller for allowing the user to create relationships and to modify created relationships between components via the graphical user interface.

22. The system of claim 17 wherein the one or more pre-constructed components defines its interfaces in a WSDL and stores the interfaces in a .nsf file as design notes.

23. The system of claim 22 wherein one of the one or more pre-constructed components is a mail view component and another is a contact view component and the mail view component and the contact view component publish the properties of commonName, canonicalName, emailAddress, and Notes URL of currently selected document.

* * * * *